(12) United States Patent
Lee et al.

(10) Patent No.: US 8,576,160 B2
(45) Date of Patent: Nov. 5, 2013

(54) DISPLAY APPARATUS AND METHOD FOR DRIVING DISPLAY APPLYING THE SAME

(75) Inventors: Eun-jae Lee, Seoul (KR); Young-jai Bai, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/086,513

(22) Filed: Apr. 14, 2011

(65) Prior Publication Data

US 2012/0032993 A1 Feb. 9, 2012

(30) Foreign Application Priority Data

Aug. 6, 2010 (KR) ........................ 10-2010-0076013

(51) Int. Cl.
*G09G 3/36* (2006.01)
(52) U.S. Cl.
USPC ............................. 345/102; 348/51; 359/466
(58) Field of Classification Search
None
See application file for complete search history.

(56) References Cited

U.S. PATENT DOCUMENTS

| | | | |
|---|---|---|---|
| 2004/0252097 A1* | 12/2004 | Kaneki et al. | 345/102 |
| 2008/0088566 A1* | 4/2008 | Chiang et al. | 345/100 |
| 2009/0102778 A1* | 4/2009 | Tu et al. | 345/100 |
| 2010/0110058 A1* | 5/2010 | Moh et al. | 345/211 |
| 2010/0157032 A1* | 6/2010 | Park et al. | 348/57 |
| 2012/0007969 A1* | 1/2012 | Lin | 348/56 |

* cited by examiner

*Primary Examiner* — Quan-Zhen Wang
*Assistant Examiner* — Chad Dicke
(74) *Attorney, Agent, or Firm* — Sughrue Mion, PLLC

(57) ABSTRACT

A display apparatus and a method for driving display thereof are provided. The display apparatus drives an upper backlight unit and a lower backlight unit so that a first time period during which both the upper backlight unit and the lower backlight unit are simultaneously turned on exceeds half of a second time period during which the upper backlight unit is turned on. Accordingly, the display apparatus may increase a time period during which both the upper backlight unit and the lower backlight unit are simultaneously turned on.

28 Claims, 8 Drawing Sheets

DISPLAY APPARATUS AND METHOD FOR DRIVING DISPLAY APPLYING THE SAME

CROSS-REFERENCE TO RELATED APPLICATIONS

This application claims priority from Korean Patent Application No. 2010-0076013, filed in the Korean Intellectual Property Office on Aug. 6, 2010, the disclosure of which is incorporated herein by reference in its entirety.

BACKGROUND

1. Field

Apparatuses and methods consistent with exemplary embodiments relate to a display apparatus and a method for driving the display apparatus, and more particularly, to a display apparatus of which backlight is operated as being divided into an upper part and a lower part and a method for driving the display apparatus.

2. Description of the Prior Art

A liquid crystal display (LCD) apparatus may display a three-dimensional (3D) stereoscopic image as a 120 Hz image. In addition, an LCD apparatus may add a blank image (B) between a left eye image (L) and a right eye image (R) (that is, display an image frame in the order of LBRB) to prevent cross talk effect of the left eye image and the right eye image of the 3D image.

A backlight of an LCD display apparatus operates as being divided into an upper part and a lower part, and the time when the upper part and the lower part are turned on is different from each other. If the upper part of a backlight is turned on while the lower part of the backlight is turned off or vice versa, brightness in a vertical direction of a screen of the LCD apparatus becomes out of balance.

A user desires to watch an even and high quality image. Therefore, a method for improving balance in a vertical brightness of an LCD apparatus is required.

SUMMARY

One or more exemplary embodiments provide to a display apparatus which drives an upper backlight unit and a lower backlight unit such that a time period during which both the upper backlight unit and the lower backlight unit are simultaneously turned on exceeds half of a time period during which the upper backlight unit is turned on and a method for driving display applying the same.

One or more exemplary embodiments also provide to a display apparatus which operates a panel in a frequency of 480 Hz according to an input image signal and a method for driving display applying the same.

According to an aspect of an exemplary embodiment, there is provided a display apparatus including a panel which displays input image data, an upper backlight unit which irradiates backlight on an upper part of the panel, a lower backlight unit which irradiates backlight on a lower part of the panel, a timing controller which drives a panel in a first frequency according to an input image signal, and a backlight driving unit which drives the upper backlight unit and the lower backlight unit based on the first frequency so that a time period during which both the upper backlight unit and the lower backlight unit are simultaneously turned on exceeds half of a time period during which the upper backlight unit is turned on.

The first frequency may display more than two frames in the panel while the upper backlight unit is turned on.

The first frequency may be a frequency of V sync signal.

The backlight driving unit may drive the upper backlight unit and the lower backlight unit to be turned on and off repeatedly according to a second frequency.

The first frequency may be more than four times as much as the second frequency.

The first frequency may be four times the second frequency. For example, the first frequency may be 480 Hz and the second frequency may be 120 Hz.

The timing controller may display an image from a bottom of the panel to a top of the panel, and the backlight driving unit may drive the lower backlight unit to be turned on when image display is completed on a lower part of the panel and the upper backlight unit to be turned on when image display is completed on an upper part of the panel.

The timing controller may drive the panel so that a 3D image including a left eye image and a right eye image is displayed.

The display apparatus may further include a frame rate converter which converts a frequency of an input image signal and outputs a converted image signal, and a repeater unit which generates an image signal in the first frequency by increasing a frequency of the converted image signal output from the frame rate converter and transmits the generated image signal in the first frequency to the timing controller.

The display apparatus may further include a frame rate converter which converts a frequency of an input image signal and outputs a converted image signal, and the timing controller may drive the panel in the first frequency by increasing a frequency of the converted image signal input from the frame rate converter.

According to an aspect of another exemplary embodiment, there is provided a method for driving display including a panel which displays input image data, an upper backlight unit which irradiates backlight on an upper part of the panel, a lower backlight unit which irradiates backlight on a lower part of the panel, the method including driving a panel in a first frequency according to an input image signal and driving the upper backlight unit and the lower backlight unit based on the first frequency so that a time period during which both the upper backlight unit and the lower backlight unit are simultaneously turned on exceeds half of a time period during which the upper backlight unit is turned on.

The first frequency may display more than two frames in the panel while the upper backlight unit is turned on.

The first frequency may be a frequency of V sync signal.

The driving the backlight unit may include driving the upper backlight unit and the lower backlight unit to be turned on and off repeatedly according to a second frequency.

The first frequency may be more than four times as much as the second frequency.

The first frequency may be four times the second frequency. For example, the first frequency may be 480 Hz and the second frequency may be 120 Hz.

The driving the panel may include displaying an image from a bottom of the panel to a top of the panel, and the driving backlight may include driving the lower backlight unit to be turned on when image display is completed on a lower part of the panel and the upper backlight unit to be turned on when image display is completed on an upper part of the panel.

The input image signal may be a 3D image including a left eye image and a right eye image.

The method may further include converting a frame rate by converting a frequency of an input image signal, and generating an image signal in the first frequency by a repeater by increasing a frequency of an image signal output from the frame rate converter.

The method may further include converting a frame rate by converting a frequency of an input image signal, and the driving a panel may include driving the panel in the first frequency by a timing controller by increasing a frequency of an image signal input from the frame rate converter.

According to an aspect of another exemplary embodiment, there is provided a display apparatus including a panel which displays input image data and a timing controller which drives a panel in 480 Hz according to an input image signal.

The display apparatus may further include a frame rate converter which converts a frequency of an input 60 Hz image signal into 240 Hz and a repeater which increases a frequency of an image signal output from the frame rate converter from 240 Hz to 480 Hz and transmits the image signal in 480 Hz to the timing controller.

The display apparatus may further include a frame rate converter which converts a frequency of an input 60 Hz image signal to 240 Hz, and the timing controller may drive the panel in 480 Hz by increasing a frequency of an image signal input from the frame rate converter from 240 Hz to 480 Hz.

The timing controller may drive the panel so that a 3D image including a left eye image and a right eye image is displayed.

The display apparatus may further include a backlight unit which irradiates backlight on the panel, and the backlight unit may be one of a backlight with an up and down driving method, a backlight with a left and right driving method, and a backlight with a light emitting diode (LED) blinking method.

According to an aspect of another exemplary embodiment, there is provided a method for driving display including a panel which displays input image data and a timing controller which drives the panel, the method including receiving an image signal in 60 Hz and driving a panel in 480 Hz according to an input image signal.

The method may further include converting a frame rate by converting a frequency of an input image signal from 60 Hz to 240 Hz and generating an image signal in 480 Hz by increasing a frequency of an image signal output from the frame rate converter from 240 Hz to 480 Hz by a repeater.

The method may further include converting a frame rate by converting a frequency of an input image signal from 60 Hz to 240 Hz, and the driving a panel may include driving the panel in 480 Hz by increasing a frequency of an image signal input from the frame rate converter from 240 Hz to 480 Hz by a timing controller.

The input image signal may be a 3D image signal including a left eye image and a right eye image.

The method may further include irradiating backlight on the panel, and the irradiating backlight may include irradiating backlight using one of a backlight unit with an up and down driving method, a backlight unit with a left and right driving method, and a backlight unit with an LED blinking method.

As described above, according to various exemplary embodiments, a display apparatus which drives an upper backlight unit and a lower backlight unit so that a time period during which both the upper backlight unit and the lower backlight unit are simultaneously turned on exceeds half of a time period during which the upper backlight unit is turned on and a method for driving display thereof are provided. Accordingly, the display apparatus may increase the time period during which both the upper backlight unit and the lower backlight unit are simultaneously turned on. Therefore, the display apparatus may improve brightness balance in up and down of a screen.

In addition, as a display apparatus which drives a panel in 480 Hz according to an input image signal and a method for driving display thereof are provided, cross talk effect or brightness imbalance caused by a liquid crystal response time may be reduced.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
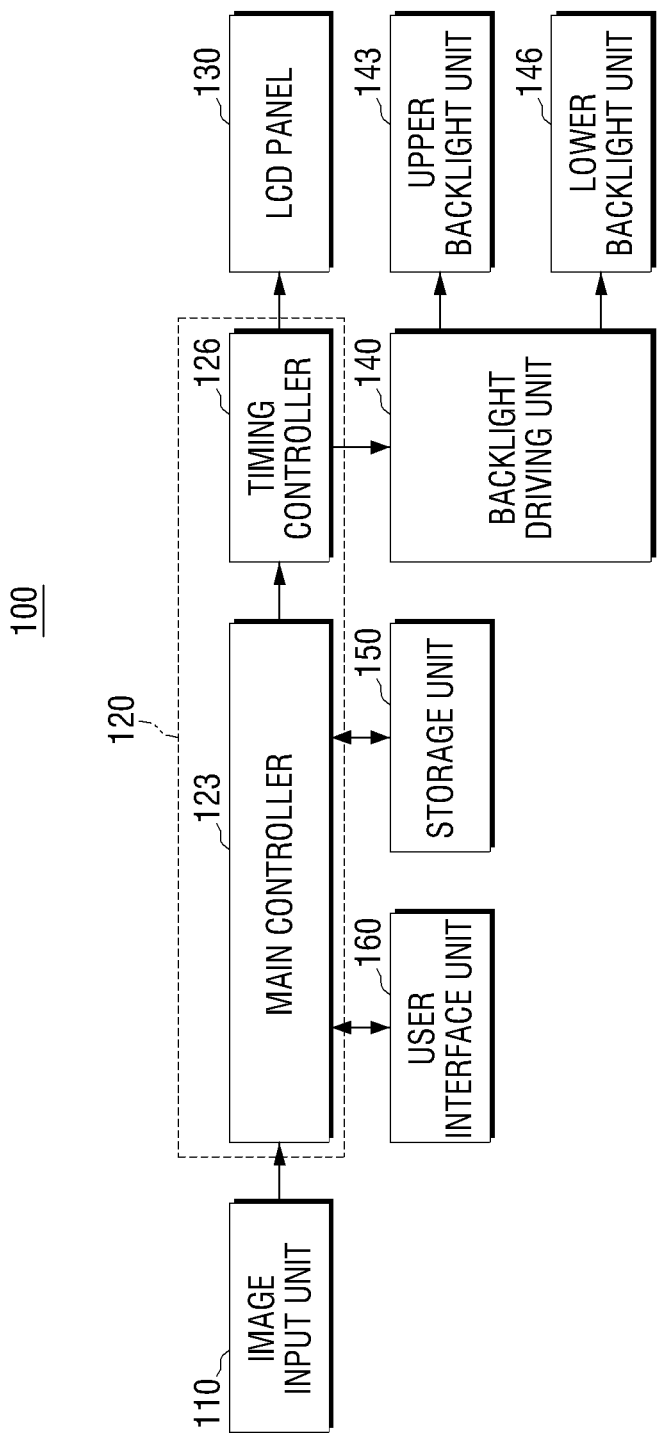
FIG. 1 is a view illustrating configuration of an LCD TV according to an exemplary embodiment.

Certain exemplary embodiments are described in detail below with reference to the accompanying drawings.

In the following description, like drawing reference numerals are used for the like elements, even in different drawings. The following description is provided to assist in a comprehensive understanding of exemplary embodiments. However, the exemplary embodiments can be practiced without specifically defined matters provided in the description and the description should not be read as limiting to those specifically defined matters. Also, well-known functions or constructions are not described in detail since they would obscure the application with unnecessary detail.

FIG. 1 is a view illustrating configuration of an LCD television (TV) 100 according to an exemplary embodiment. As illustrated in FIG. 1, the LCD TV 100 comprises an image input unit 110, a controller 120, an LCD panel 130, a backlight driving unit 140, an upper backlight unit 143, a lower backlight unit 146, a storage unit 150, and a user interface unit 160.

The image input unit 110 receives an image signal from an outside source. Specifically, the image input unit 110 may be a tuner which receives a broadcasting signal or an A/V interface which receives a wired broadcast, an analog image signal or a digital image signal. In addition, the image input unit 110 may receive a three-dimensional (3D) image including a left eye image and a right eye image.

The controller 120 generates a driving signal to drive the LCD panel 130 according to an input image and applies the generated driving signal to the backlight driving unit 140. In this case, the controller 120 may adjust a driving frequency of the LCD panel 130.

As illustrated in FIG. 1, the controller 120 includes a main controller 123 and a timing controller 126. The main controller 123 controls the overall operation of the LCD TV 100. Specifically, the main controller 123 processes an image input through the image input unit 110 and outputs the processed image signal to the timing controller 126. The main controller 123 also controls other various operations of the LCD TV 100. The main controller 123 is disposed on a main board or an image board of the LCD TV 100.

The timing controller 126 drives the LCD panel 130 according to an image signal input from the main controller 123. Specifically, the timing controller 126 adjusts a driving timing of the LCD panel 130 by generating a driving signal to drive the LCD panel 130 and applying the generated driving signal to the LCD panel 130. Through the above process, the timing controller 126 drives the LCD panel 130.

In particular, the timing controller 126 drives the LCD panel 130 in a first frequency. Herein, the first frequency represents a frequency of a V sync signal output from the timing controller 126. The timing controller 126 outputs a signal including an H sync signal, a V sync signal, and an image data signal to drive the LCD panel 130. Since the LCD panel 130 displays one frame for each period of V sync signal, the frequency of V sync signal becomes a frame frequency for displaying an image.

In this case, the first frequency represents a frequency with a speed for displaying more than two frames in the LCD panel 130 while the upper backlight unit 143 (or the lower backlight unit 146) is turned on.

For example, if the first frequency is 240 Hz and a second frequency, which is a backlight frequency, is 120 Hz, one frame is displayed in the LCD panel 130 while the upper backlight unit 143 is turned on, thereby not satisfying the above condition (i.e., that the first frequency represents a frequency with a speed for displaying more than two frames). In this case, the second frequency represents a frequency of a backlight driving signal which causes the upper backlight unit 143 (or the lower backlight unit 146) to be turned on and off repeatedly. That is, one period of a backlight driving signal having the second frequency represents a period during which the upper backlight unit 143 goes through the on and off states once.

Alternatively, if the first frequency is 480 Hz and the second frequency which is a backlight frequency is 120 Hz, two frames are displayed in the LCD panel 130 while the upper backlight unit 143 is turned on, the first frequency represents a frequency with a speed for displaying two frames. If the first frequency is 960 Hz and the second frequency which is a backlight frequency is 120 Hz, four frames are displayed in the LCD panel 130 while the upper backlight unit 143 is turned on, thereby satisfying the above condition (i.e., that the first frequency represents a frequency with a speed for displaying more than two frames).

Thus, it can be seen that if the first frequency is more than four times the second frequency, the first frequency becomes a frequency for displaying more than two frames in the LCD panel 130 while the upper backlight unit 143 (or the lower backlight unit 146) is turned on.

As such, the backlight driving unit 140 may increase a time period during which both the upper backlight unit 143 and the lower backlight unit 146 are simultaneously turned on as the timing controller 126 adjusts the first frequency to a frequency for displaying more than two frames in the LCD panel 130 while the upper backlight unit 143 (or the lower backlight unit 146) is turned on. Accordingly, brightness balance in a vertical direction of a screen of the LCD TV 100 may be improved.

In addition, the timing controller 126 may drive the LCD panel 130 to display a 3D image including a left eye image and a right eye image. For example, if the LCD panel 130 is operated in 480 Hz, the timing controller 126 may drive the LCD panel 130 by repeating a left eye image frame (hereinafter, referred to as "L") and a right eye image frame (hereinafter, referred to as "R") in the order of 'LLLRRRR' so that a 3D image can be displayed. In addition, if a blank image frame (or a black image, referred to as "B" hereinafter) is included, the timing controller 126 may drive the LCD panel 130 by repeating image frames in the order of 'LLBBRRBB' so that a 3D image can be displayed.

If the timing controller 126 displays a 2D image in 480 Hz, the timing controller 126 may drive the LCD panel 130 to repeat the same frame eight times.

The timing controller 126 drives the LCD panel 130 to display an image from an image disposed in a bottom pixel to an image in upwards direction towards a top pixel. That is, the timing controller 126 applies a scanning signal of a pixel line from bottom to top. Accordingly, the lower backlight unit 146 is turned on first and then the upper backlight unit 143 is turned on later.

The timing controller 126 may be disposed on a timing control board (that is, a TCON board).

The LCD panel 130 displays input image data according to the control of the timing controller 126. The LCD panel 130 is composed of two transparent substrates with liquid crystal in between. The liquid crystal alignment of the LCD panel 130 is changed by voltage applied to a portion between the two substrates, thereby changing a refraction rate to pass light at a desired refraction rate. By applying this principal, the LCD panel 130 generates an image corresponding to input image data.

The backlight driving unit 140 drives an on/off operation of the upper backlight unit 143 and the lower backlight unit 146 in the above-mentioned frequency. For example, the backlight driving unit 140 may drive the upper backlight unit 143 and the lower backlight unit 146 in a frequency of 120 Hz.

Specifically, the backlight driving unit 140 drives the upper backlight unit 143 and the lower backlight unit 146 based on the first frequency (that is, a frequency of the V sync signal) so that a time period during which both the upper backlight unit 143 and the lower backlight unit 146 are simultaneously turned on exceeds half of a time period during which the upper backlight unit 143 (or the lower backlight unit 146) is turned on.

The time period during which both the upper backlight unit 143 and the lower backlight unit 146 are simultaneously turned on (hereinafter, referred to as an overlap period) represents a time period during which backlight for the entire screen is turned on. Accordingly, the longer the overlap period is, the more uniform the brightness becomes in a vertical of the screen.

The backlight driving unit 140 turns on the lower backlight unit 146 when image display is completed on a lower part of the LCD panel 130. In addition, the backlight driving unit 140 turns on the upper backlight unit 143 when image display is completed on an upper part of the LCD panel 130. Accordingly, the backlight driving unit 140 turns on the lower backlight unit 146 first and the upper backlight unit 143 later. Therefore, the upper backlight unit 143 and the lower backlight unit 146 operate in the same frequency, but perform on/off operation at different times.

In particular, if the backlight driving unit 140 drives the upper backlight unit 143 and the lower backlight unit 146 in the above-mentioned way, the greater the value of the first frequency, the longer the time during which the upper backlight unit 143 and the lower backlight unit 146 are turned on.

The upper backlight unit 143 irradiates backlight on an upper part (the upper area when the LCD panel 130 is divided into two areas) of the LCD panel 130. The lower backlight unit 146 irradiates backlight on a lower part (the lower area when the LCD panel 130 is divided into two areas) of the LCD panel 130.

The upper backlight unit 143 and the lower backlight unit 146 include at least one light source, and provide light generated by the light source to the LCD panel 130. For example, a light source may be embodied using an LED which is a point light source. Alternatively, a line light source or a surface light source may be used instead of a point light source. For example, a Cold Cathode Fluorescent Lamp (CCFL) may be used as a line light source.

The storage unit 150 stores various software to drive the LCD TV 100. The storage unit 150 may be one of various storing media such as a non-volatile memory, an Electrically Erasable Programmable Read-Only Memory (EEPROM), a hard disk, and the like.

The user interface unit 160 receives a command from a user. The user interface may be a button disposed on the LCD TV 100 or a remote controller.

As a driving frequency increases, the LCD TV 100 drives an upper backlight unit and a lower backlight unit such that a time period during which both the upper backlight unit and the lower backlight unit are simultaneously turned on exceeds half of a time period during which the upper backlight unit is turned on. Accordingly, a time period during which both the upper backlight unit and the lower backlight unit are simultaneously turned on increases, thereby improving uniformity of brightness in a vertical direction of the screen of the LCD TV 100.

Various methods can be used to increase a driving frequency of the LCD TV 100. For example, the timing controller 126 may increase and output a frequency of an input image signal. Specifically, the timing controller 126 may receive an image signal in 240 Hz and output a driving signal in 480 Hz corresponding to the input image signal. This will be explained in detail with reference to FIG. 5.

A frequency of an image signal may be increased using a repeater. For example, a repeater may increase and output a frequency of an image signal input from a frame rate converter. Specifically, a repeater may receive an image signal in 240 Hz and output an image signal in 480 Hz by repeating it. This will be explained in detail with reference to FIGS. 6 and 7.

In addition, a frame rate converter may increase and output a frequency of an input image signal. For example, a frame rate converter may convert an image signal input in 60 Hz to an image signal in 480 Hz through Motion Estimation/Motion Compensation (ME/MC).

As such, the LCD TV 100 may increase a driving frequency using various methods.

Figure 2:
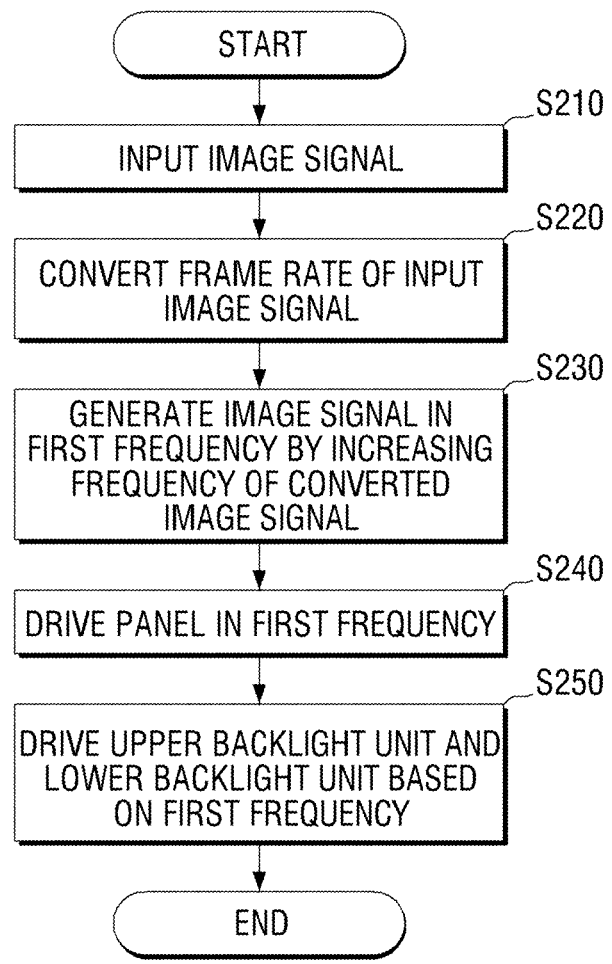
FIG. 2 is a flowchart to explain a method for driving display according to an exemplary embodiment.

Hereinafter, a method for driving display will be explained in detail with reference to FIG. 2. FIG. 2 is a flowchart to explain a method for driving display according to an exemplary embodiment.

First of all, the LCD TV 100 receives an image signal (S210). Specifically, the LCD TV 100 may receive a broadcasting signal, wired broadcast, an analog image signal or a digital image signal. In addition, the LCD TV 100 may receive a 3D image including a left eye image and a right eye image.

Subsequently, the LCD TV 100 converts a frame rate of the input image signal (S220). For example, if the input image signal has a frame rate of 60 Hz, the LCD TV 100 converts the frame rate from 60 Hz to 240 Hz. In this case, the LCD TV 100 may convert a frequency of the image signal through ME/MC using a Frame Rate Converter (FRC).

Subsequently, the LCD TV 100 generates an image signal in a first frequency by increasing a frequency of the converted image signal (S230). In this case, the LCD TV 100 may increase the frequency using a repeater or the timing controller 126.

The LCD TV 100 drives the LCD panel 130 according to a driving signal in the first frequency (S240). Specifically, the LCD TV 100 generates a driving signal to drive the LCD panel 130, and adjusts a driving timing of the LCD panel 130 by applying the generated driving signal to the LCD panel 130.

The LCD TV 100 drives the upper backlight unit 143 and the lower backlight unit 146 based on the first frequency (S250).

In particular, the LCD TV 100 drives the LCD panel 130 in the first frequency. In this case, the first frequency represents a frequency of a V sync signal output from the timing controller 126. The timing controller 126 outputs an a signal including an H sync signal, a V sync signal, and an image data signal to drive the LCD panel 130. Since the LCD panel 130 displays one frame for each period of V sync signal, the frequency of V sync signal becomes a frame frequency for displaying an image.

In this case, the first frequency represents a frequency with a speed for displaying more than two frames in the LCD panel 130 while the upper backlight unit 143 (or the lower backlight unit 146) is turned on to satisfy a condition.

For example, if the first frequency is 240 Hz and a second frequency which is a backlight frequency is 120 Hz, one frame is displayed in the LCD panel 130 while the upper backlight unit 143 is turned on, thereby not satisfying the above condition. Herein, the second frequency represents a frequency of a backlight driving signal which causes the upper backlight unit 143 (or the lower backlight unit 146) to be turned on and off repeatedly. That is, one period of a backlight driving signal having the second frequency represents a period during which the upper backlight unit 143 goes through the on and off states once.

Alternatively, if the first frequency is 480 Hz and the second frequency which is a backlight frequency is 120 Hz, two frames are displayed in the LCD panel 130 while the upper backlight unit 143 is turned on. If the first frequency is 960 Hz and the second frequency which is a backlight frequency is 120 Hz, four frames are displayed in the LCD panel 130 while the upper backlight unit 143 is turned on, thereby satisfying the above condition.

That is, it can be seen that if the first frequency is more than four times the second frequency, the first frequency becomes a frequency for displaying more than two frames in the LCD panel 130 while the upper backlight unit 143 (or the lower backlight unit 146) is turned on.

As such, the timing controller 126 of the LCD TV 100 may increase a time period during which both the upper backlight unit 143 and the lower backlight unit 146 are simultaneously turned on as the timing controller 126 adjusts the first frequency to a frequency for displaying more than two frames in the LCD panel 130 while the upper backlight unit 143 (or the lower backlight unit 146) is turned on. Accordingly, brightness balance in a vertical direction of a screen of the LCD TV 100 may be improved.

Similarly, the timing controller 126 the timing controller 126 of the LCD TV 100 may increase a time period during which both the upper backlight unit 143 and the lower backlight unit 146 are simultaneously turned on as the timing controller 126 adjusts the first frequency to a frequency for displaying at least two frames in the LCD panel 130 while the upper backlight unit 143 (or the lower backlight unit 146) is turned on.

In addition, the LCD TV 100 may drive the LCD panel 130 to display a 3D image including a left eye image and a right eye image. For example, if the LCD panel 130 is operated in 480 Hz, the LCD TV 100 may drive the LCD panel 130 by repeating a left eye image frame and a right eye image frame in the order of 'LLLLRRRR' so that a 3D image can be displayed. In addition, if a blank image frame is included, the LCD TV 100 may drive the LCD panel 130 by repeating image frames in the order of 'LLBBRRBB' so that a 3D image can be displayed.

If the LCD TV 100 displays a 2D image in 480 Hz, the LCD TV 100 may drive the LCD panel 130 to repeat the same frame eight times.

The LCD TV 100 drives the LCD panel 130 to display an image from an image disposed in a bottom pixel to an image in upwards direction towards a top pixel. That is, the LCD TV 100 applies a scanning signal of a pixel line from bottom to top. Accordingly, the lower backlight unit 146 is turned on first and then the upper backlight unit 143 is turned on later.

The LCD TV 100 drives the upper backlight unit 143 and the lower backlight unit 146 based on the first frequency (that is, a frequency of V sync signal) so that a time period during which both the upper backlight unit 143 and the lower backlight unit 146 are simultaneously turned on exceeds half of a time period during which the upper backlight unit 143 (or the lower backlight unit 146) is turned on.

The LCD TV 100 turns on the lower backlight unit 146 when image display is completed on a lower part of the LCD panel 130. In addition, the LCD TV 100 turns on the upper backlight unit 143 when image display is completed on an upper part of the LCD panel 130. Accordingly, the LCD TV 100 turns on the lower backlight unit 146 first and the upper backlight unit 143 later. Therefore, the upper backlight unit 143 and the lower backlight unit 146 operate in the same frequency, but perform on/off operation at a different time.

In particular, if the LCD TV 100 drives the upper backlight unit 143 and the lower backlight unit 146 in the above-mentioned way, the greater the value of the first frequency, the longer the time during which both the upper backlight unit 143 and the lower backlight unit 146 are simultaneously turned on.

According to the above method, the LCD TV 100 drives an upper backlight unit and a lower backlight unit so that a time period during which both the upper backlight unit and the lower backlight unit are simultaneously turned on exceeds half of a time period during which the upper backlight unit is turned on as a driving frequency increases. Since the time period during which both the upper backlight unit and the lower backlight unit are simultaneously turned on increases, the brightness balance in vertical direction of a screen of the LCD TV 100 may be improved.

Figure 3:
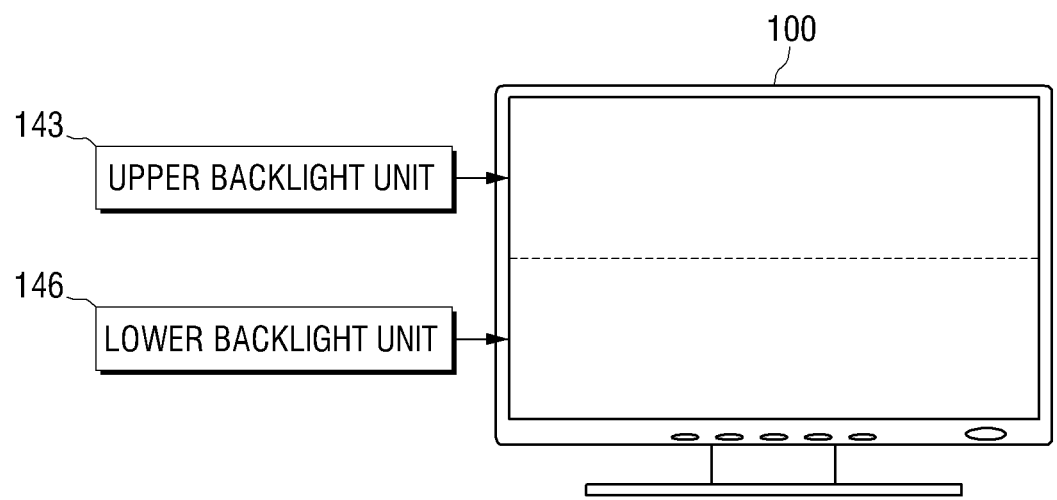
FIG. 3 is a view illustrating a backlight which is divided into an upper part and a lower part according to an exemplary embodiment.

FIG. 3 is a view illustrating a backlight which is divided into an upper part and a lower part according to an exemplary embodiment. As illustrated in FIG. 3, the upper backlight unit 143 irradiates backlight on an upper part (the upper area when an LCD panel is divided into two areas) of the LCD TV 100.

The lower backlight unit 146 irradiates backlight on a lower part (the lower area when an LCD panel is divided into two areas) of the LCD TV 100.

Hereinafter, a signal timing view will be explained according to an exemplary embodiment with reference to FIGS. 4A to 4B. Comparing FIG. 4A with FIG. 4B, it can be seen that an overlap period is longer when a driving frequency of a panel is 480 Hz than when a driving frequency of a panel is 240 Hz. Herein, the overlap period represents a period during which both the upper backlight unit 143 and the lower backlight unit 146 are simultaneously turned on.

Figure 4A:
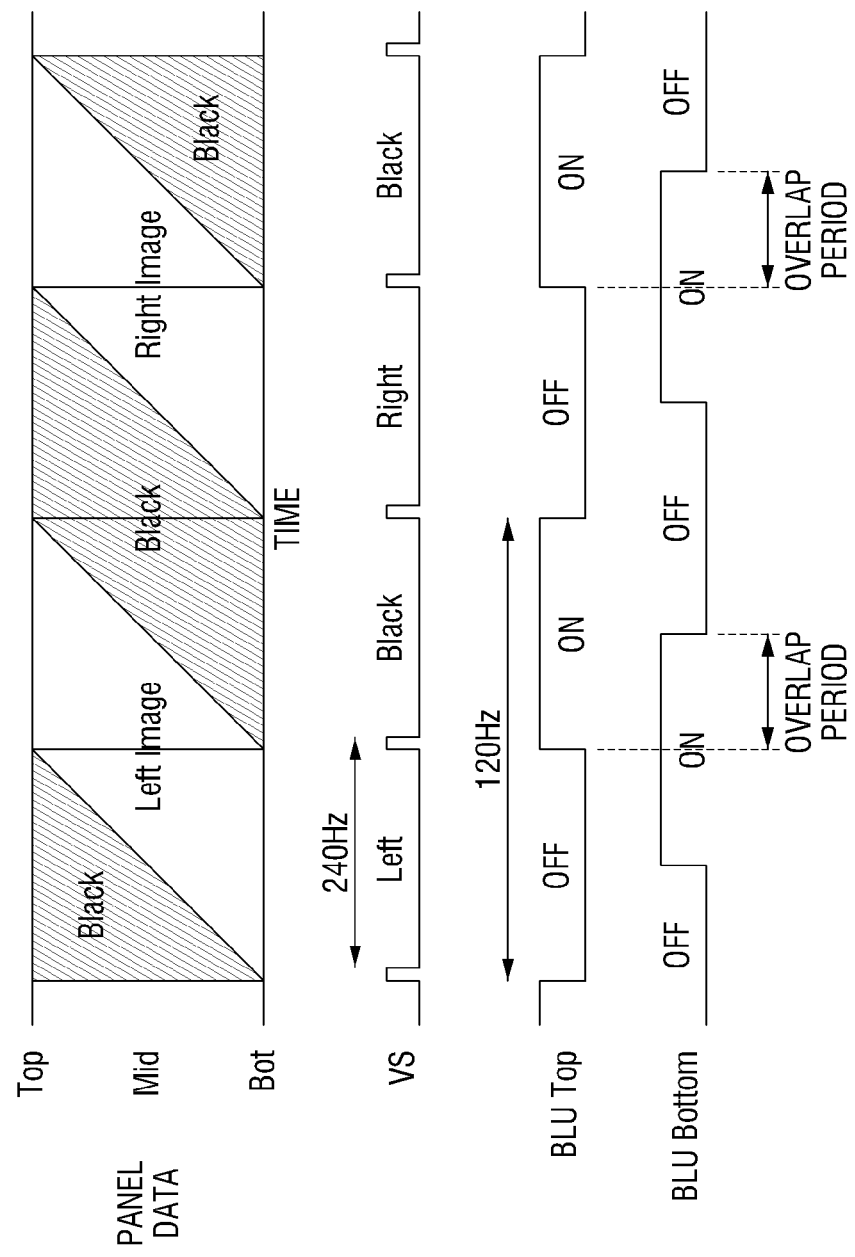
FIG. 4A is a timing view illustrating a panel and upper and lower backlights when an LCD TV operates in 240 Hz.
Figure 4B:
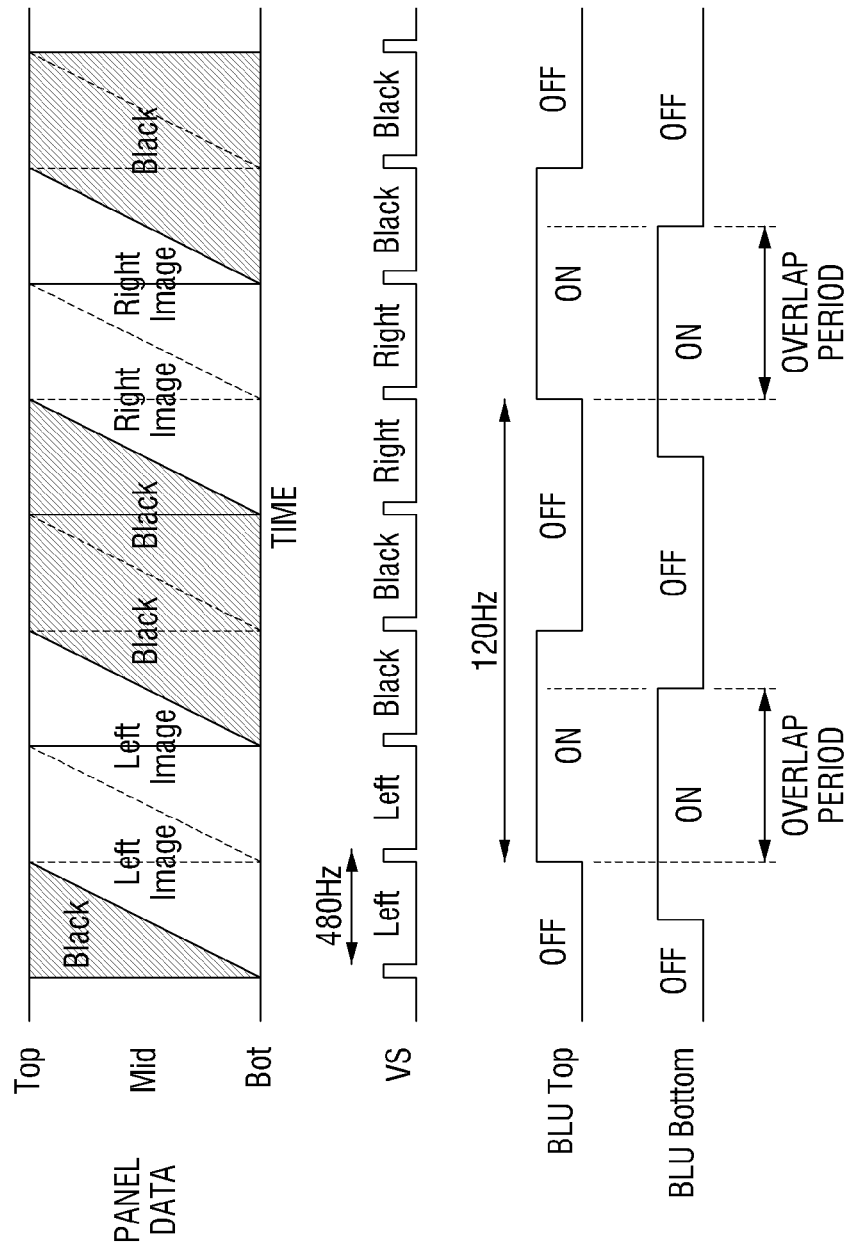
FIG. 4B is a timing view illustrating a panel and upper and lower backlights when an LCD TV operates in 480 Hz according to an exemplary embodiment.

In FIGS. 4A and 4B, it is assumed that a direction of a time axis is from left to right. In addition, 'Top' in panel data refers to an upper part of the LCD panel 130, 'Mid' refers to a middle part of the LCD panel 130, and 'Bot' refers to a lower part of the LCD panel 130. Furthermore, 'VS' refers to a V sync signal, 'BLU Top' refers to a driving signal of the upper backlight unit 143, and 'BLU Bottom' refers to the lower backlight unit 146.

FIG. 4A is a view illustrating a timing view in which an LCD panel and upper and lower backlights operate when the LCD TV 100 operates at 240 Hz.

As illustrated in FIG. 4A, it can be seen that a V sync signal is 240 Hz. That is, in FIG. 4A, the LCD panel 130 operates at 240 Hz. Referring to panel data in FIG. 4A, it can be seen that the panel data is displayed sequentially from the bottom of the LCD panel 130 to the top of the LCD panel. In addition, it can be seen that an image is displayed in the order of a left eye image, a black image, and a right eye image.

In addition, it can be seen that the lower backlight unit 146 is turned on at a time when a left eye image or a right eye image is displayed from Bot to Mid of a panel, and the lower backlight unit 146 is turned off at a time when a black image is displayed from Bot to Mid of a panel.

In addition, it can be seen that the upper backlight unit 143 is turned on at a time when a left eye image or a right eye image is displayed from Mid to Top of a panel, and the upper backlight unit 143 is turned off at a time when a black image is displayed from Mid to Top of a panel.

As such, a frequency (that is, the first frequency) of a V sync signal is 240 Hz, and a frequency (that is, the second frequency) of a backlight is 120 Hz in FIG. 4A. That is, a frequency of V sync signal is twice as much as a frequency of a backlight. In this case, the LCD panel 130 displays one frame while the upper backlight unit 143 is turned on.

In FIG. 4A, an overlap period is half of a period during which the upper backlight unit 143 is turned on. Accordingly, it can be seen that the overlap period is short.

Accordingly, in FIG. 4A, it is highly likely that imbalance in brightness in the vertical direction of a screen would occur on the LCT TV 100.

FIG. 4B is a view illustrating a timing view in which a panel and upper and lower backlights operate when the LCD TV 100 operates at 480 Hz.

As illustrated in FIG. 4B, it can be seen that a V sync signal is 480 Hz. That is, the LCD panel 130 operates in 480 Hz in FIG. 4B. Referring to panel data in FIG. 4B, it can be seen that the panel data is displayed from the bottom of the LCD panel 130 to the top of the LCD panel 130. In addition, it can be seen that an image is displayed in the order of a left eye image, a left eye image, a black image, a black image, a right eye image, a right eye image, a black image and a black image (i.e., LLBBRRBB).

In addition, it can be seen that the lower backlight unit 146 is turned on at a time when a left eye image or a right eye image is turned on from Bot to Mid of a panel, and the lower backlight unit 146 is turned off at a time when a black image is displayed from Bot to Mid of a panel.

In addition, it can be seen that the upper backlight unit 143 is turned on at a time when a left eye image or a right eye image is displayed from Mid to Top of a panel, and the upper backlight unit 143 is turned off at a time when a black image is displayed from Mid to Top of a panel.

As such, a frequency (that is, the first frequency) of a V sync signal is 480 Hz, and a frequency (that is, the second frequency) of a backlight is 120 Hz in FIG. 4B. That is, a frequency of V sync signal is four times as much as a frequency of a backlight. In this case, the LCD panel 130 displays two frames while the upper backlight unit 143 is turned on.

In FIG. 4B, the overlap period is 75% of a period during which the upper backlight unit 143 is turned on, which indicates that the overlap period has been prolonged. Accordingly, brightness balance in the vertical direction of a screen of the LCD TV 100 may be improved in FIG. 4B.

As such, comparing FIG. 4A with FIG. 4B, it can be seen that the overlap period becomes more than half of a period during which the upper backlight unit 143 is turned on when the first frequency is at least four times as much as the second frequency. Therefore, brightness balance in the vertical direction of a screen is improved. Thus, the timing controller 126 may adjust the first frequency to a frequency for displaying at least two frames in the LCD panel 130 while the upper backlight unit 143 (or the lower backlight unit 146) is turned on. As shown in FIG. 4B, a time period during which both the upper backlight unit 143 and the lower backlight unit 146 are simultaneously turned on exceeds half of a time period during which the upper backlight unit 143 (or the lower backlight unit 146) is turned on when the first frequency is four times the second frequency.

As described above, since the LCD panel 130 is operated at 480 Hz, the display apparatus 100 may reduce a cross talk effect or a brightness imbalance caused by a liquid crystal response time.

In the above description, a display apparatus including a backlight which is divided into upper and lower parts is taken as an example, but this is only an example. The technical feature of the present disclosure can be applied to other types of backlight. That is, the technical feature of the present disclosure may be applied to any display apparatus including a panel which operates at 480 Hz regardless of the type of backlight.

For example, the technical feature of the present disclosure may be applied not only to a backlight unit with an up and down driving method but also to a backlight unit with a left and right driving method and a backlight unit with an LED blinking method. Herein, the backlight unit with a left and right driving method represents a method for driving a backlight unit by dividing a screen into left and right parts. The LED blinking method represents a method for irradiating a backlight by causing an LED to blink at predetermined intervals. As such, the technical feature of the present disclosure may be applied to a display apparatus regardless of the type of backlight.

Hereinafter, various methods for increasing a driving frequency so as for the LCD TV 100 to operate at 480 Hz will be explained with reference to FIGS. 5 to 7.

Figure 5:
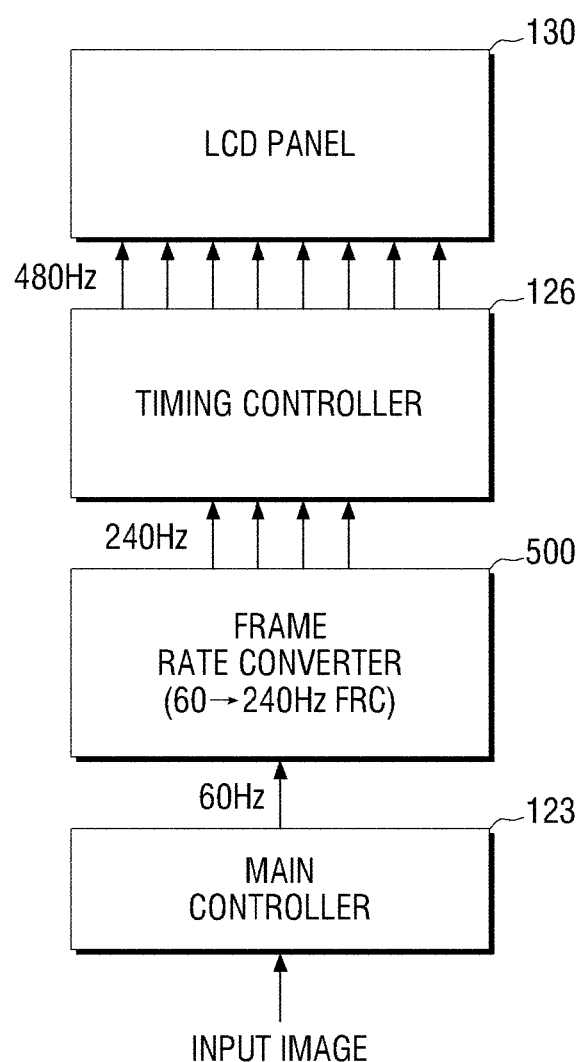
FIG. 5 is a view illustrating a case where a frequency is increased by a frame rate converter and a timing controller according to an exemplary embodiment.

FIG. 5 is a view illustrating a case where a frequency is increased by the frame rate converter 500 and the timing controller 126 according to an exemplary embodiment.

The frame rate converter 500 in FIG. 5 increases a frame rate (that is, a frequency) of an image signal. For example, if an image signal of 60 Hz is input, the frame rate converter 500 converts the image signal of 60 Hz into an image signal of 240 Hz.

In addition, if a 2D image is input, the frame rate converter 500 converts the image signal of 60 Hz into an image signal of 240 Hz by applying ME/MC. If a 3D image is input, the frame rate converter 500 converts the 3D image signal in 60 Hz into an image signal in 240 Hz by extracting a left eye image (L) and a right eye image (R) from the 3D image signal and converting it into 'LLRR' or 'LBRB'. Herein, 'B' represents a black image.

The frame rate converter 500 may be disposed on a main board or on a timing control board (that is, a TCON board). The main controller 123 or the timing controller 126 may include the function of the frame rate converter 500.

As illustrated in FIG. 5, if an image is input, the main controller 123 outputs an image signal of 60 Hz. Subsequently, the frame rate converter 500 outputs the image signal of 60 Hz as an image signal of 240 Hz.

The timing controller 126 receives the image signal in 240 Hz and outputs a driving signal in 480 Hz, thereby driving the LCD panel 130 in 480 Hz.

In the case of a 2D image, the timing controller 126 may double a frequency by repeating the same frame twice. In addition, in the case of a 2D image, the timing controller 126 may double a frequency by calculating a median value of front and back frames of an input image frame (that is, using temporal interpolation) and inserting a new frame between each frame.

If a 3D image is input, the timing controller 126 may double a frequency by generating the same frame as the previous frame and inserting it immediately after the duplicated frame. For example, if an image signal of 'LLRR' or 'LBRB' is input from the frame converter 500, the timing controller 126 converts the image signal into 'LLLLRRRR' or 'LLBBRRBB' and outputs the converted image signal to the LCD panel 130.

As such, the timing controller 126 may increase a frequency of an image signal from 240 Hz to 480 Hz.

In addition, a method for increasing a frequency of an image signal using a repeater may be applied, and the method will be explained with reference to FIGS. 6 and 7. FIG. 6 is a view illustrating a case where a frequency is increased by the repeater 610 included between the frame rate converter 500 and the timing controller 126 according to an exemplary embodiment.

Figure 6:
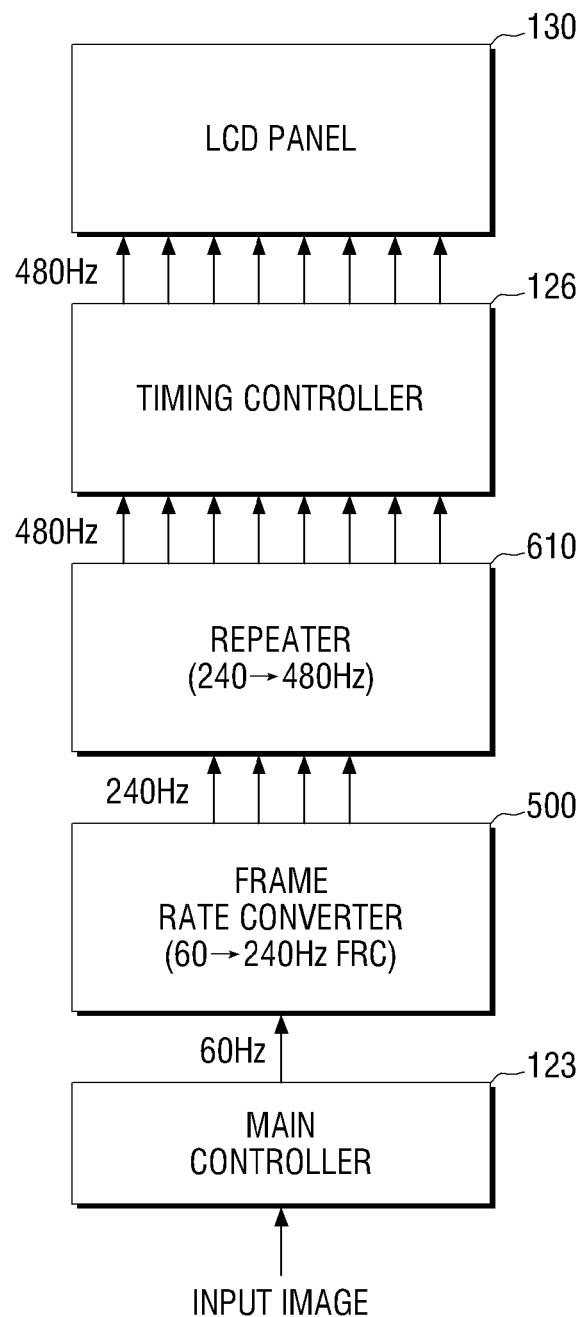
FIG. 6 is a view illustrating a case where a frequency is increased by a repeater included between a frame rate converter and a timing controller according to an exemplary embodiment.

The frame rate converter 500 illustrated in FIG. 6 increases a frame rate (that is, a frequency) of an image signal. For example, if an image signal in 60 Hz is input, the frame rate converter 500 converts the image signal of 60 Hz into an image signal of 240 Hz.

In addition, if a 2D image is input, the frame rate converter 500 converts the image signal of 60 Hz into an image signal of 240 Hz by applying ME/MC. If a 3D image is input, the frame rate converter 500 converts the 3D image signal in 60 Hz into an image signal in 240 Hz by extracting a left eye image (L) and a right eye image (R) from the 3D image signal and converting it into 'LLRR' or 'LBRB'. Herein, 'B' represents a black image.

The frame rate converter 500 may be disposed on a main board or on a timing control board (that is, a TCON board). The main controller 123 or the timing controller 126 may include the function of the frame rate converter 500.

The repeater 610 increases a frequency of an input image signal. For example, the repeater 610 may convert an image signal of 240 Hz into an image signal of 480 Hz.

Specifically, if a 2D image is input, the repeater 610 converts an image signal of 240 Hz into an image signal of 480 Hz by applying ME/MC. If a 3D image is input, the repeater 610 may double a frequency by generating the same frame as the previous frame and inserting it immediately after the duplicated frame. For example, if an image signal of 'LLRR' or 'LBRB' is input from the frame converter 500, the repeater 610 converts the image signal into 'LLLLRRRR' or 'LLBBRRBB' and outputs the converted image signal to the timing controller 126.

As illustrated in FIG. 6, if an image is input, the main controller 123 outputs an image signal. Subsequently, the frame rate converter 500 outputs an image signal of 240 Hz from an image signal of 60 Hz.

The repeater 610 receives the image signal in 240 Hz and outputs an image signal in 480 Hz by increasing a frequency.

Subsequently, the timing controller 126 receives the image signal in 480 Hz and drives the LCD panel 130 in 480 Hz according to the image signal in 480 Hz.

As such, the repeater 610 may increase a frequency of an image signal by converting 240 Hz into 480 Hz.

Figure 7:
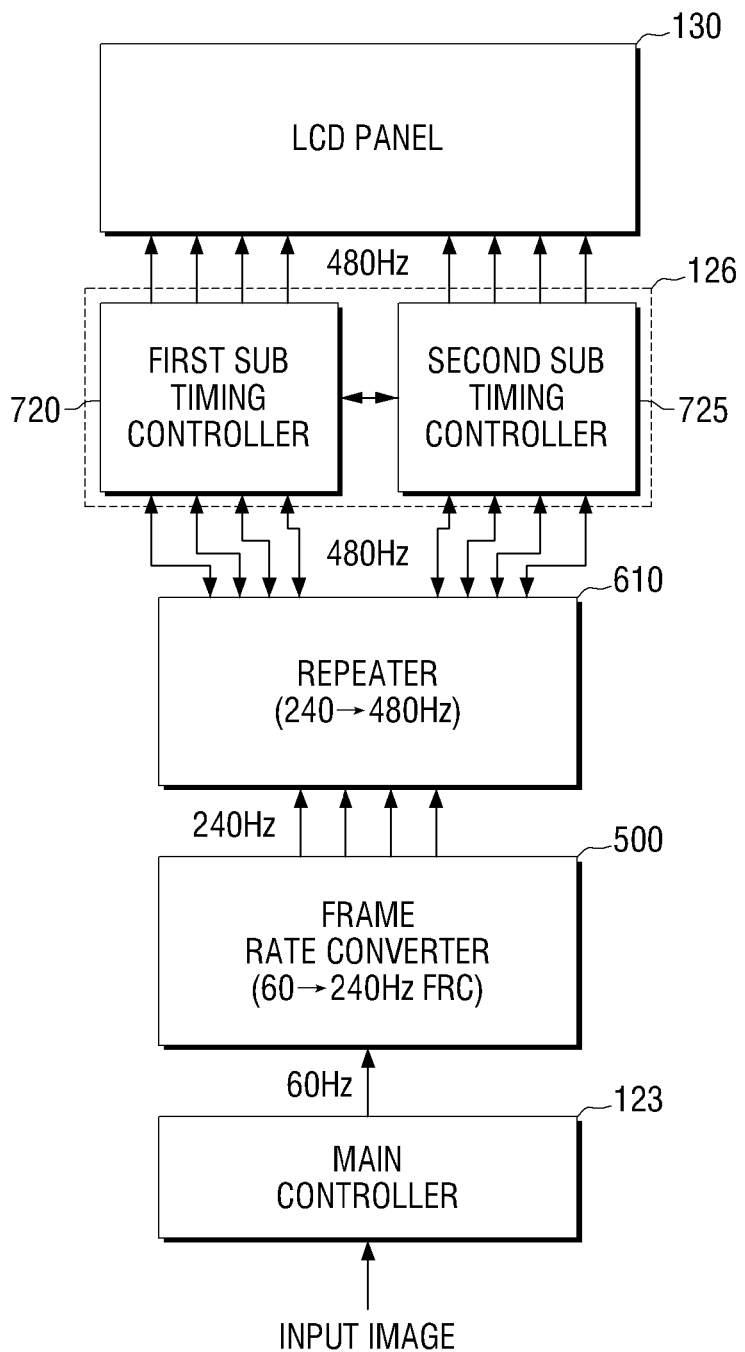
FIG. 7 is a view illustrating a case where a repeater is included between a frame rate converter and a timing controller and there are two timing controllers according to an exemplary embodiment.

FIG. 7 is a view illustrating a case where the repeater 610 is included between the frame rate converter 500 and the timing controller 126 and there are two timing controllers according to an exemplary embodiment.

Since the configuration in FIG. 7 is nearly the same as the configuration in FIG. 6, a description of overlapping portions will not be provided and only the difference between the configurations in FIGS. 6 and 7 will be explained.

FIG. 7 illustrates a case where the timing controller 126 includes of a first sub timing controller 720 and a second sub timing controller 725. Independently, each sub timing controller 720 and 725 in FIG. 7 is configured to process an image signal of 240 Hz. Accordingly, in order to process an image signal of 480 Hz, the timing controller 126 in FIG. 7 may include two sub timing controllers, that is, the first sub timing controller 720 and the second sub timing controller 725. In this case, the first sub timing controller 720 and the second sub timing controller 725 should be synchronized with each other.

As such, the LCD TV 100 may increase a driving frequency using various methods.

In the exemplary embodiment, it is assumed that a display apparatus is the LCD TV 100, but this is only an example. Any LCD display apparatus may be a display apparatus. For example, an LCD apparatus may be a 3D LCD TV, a general LCD TV, an LCD monitor, or a notebook computer.

Although a few exemplary embodiments of the present disclosure have been shown and described, it would be appreciated by those skilled in the art that changes may be made in the exemplary embodiments without departing from the principles and spirit of the general inventive concept, the scope of which is defined in the claims and their equivalents.

What is claimed is:

1. A display apparatus comprising:
   a panel which displays input image data;
   an upper backlight unit which irradiates backlight on an upper part of the panel;
   a lower backlight unit which irradiates backlight on a lower part of the panel;
   a timing controller which drives the panel in a first frequency according to an input image signal; and
   a backlight driving unit which drives the upper backlight unit and the lower backlight unit based on the first frequency so that a first time period during which both the upper backlight unit and the lower backlight unit are simultaneously turned on exceeds half of a second time period during which the upper backlight unit is turned on,
   wherein the first frequency displays more than two frames in the panel while the upper backlight unit is turned on.

2. The display apparatus as claimed in claim 1, wherein the first frequency is a frequency of V sync signal.

3. The display apparatus as claimed in claim 1, wherein the backlight driving unit drives the upper backlight unit and the lower backlight unit to be turned on and off repeatedly according to a second frequency.

4. The display apparatus as claimed in claim 3, wherein the first frequency is more than four times greater than the second frequency.

5. The display apparatus as claimed in claim 3, wherein the first frequency is four times the second frequency.

6. The display apparatus as claimed in claim 1, wherein the timing controller displays an image from a bottom of the panel to a top of the panel,
   wherein the backlight driving unit drives the lower backlight unit to be turned on when an image display is completed on the lower part of the panel and drives the upper backlight unit to be turned on when the image display is completed on the upper part of the panel.

7. The display apparatus as claimed in claim 1, wherein the timing controller drives the panel so that a three-dimensional image including a left eye image and a right eye image is displayed.

8. The display apparatus as claimed in claim 1, further comprising:
   a frame rate converter which converts a frequency of the input image signal and outputs a converted image signal; and
   a repeater unit which generates an image signal in the first frequency by increasing a frequency of the converted image signal output from the frame rate converter and transmits the generated image signal in the first frequency to the timing controller.

9. The display apparatus as claimed in claim 1, further comprising:
   a frame rate converter which converts a frequency of the input image signal and outputs a converted image signal,
   wherein the timing controller drives the panel by the first frequency by increasing a frequency of the converted image signal output from the frame rate converter.

10. A method for driving display including a panel which displays input image data, an upper backlight unit which irradiates backlight on an upper part of the panel, and a lower backlight unit which irradiates backlight on a lower part of the panel, the method comprising:
    driving the panel in a first frequency according to an input image signal; and
    driving the upper backlight unit and the lower backlight unit based on the first frequency so that a first time period during which both the upper backlight unit and the lower backlight unit are simultaneously turned on exceeds half of a second time period during which the upper backlight unit is turned on,
    wherein the first frequency displays more than two frames in the panel while the upper backlight unit is turned on.

11. The method as claimed in claim 10, wherein the first frequency is a frequency of V sync signal.

12. The method as claimed in claim 10, wherein the driving the backlight unit comprises driving the upper backlight unit and the lower backlight unit to be turned on and off repeatedly according to a second frequency.

13. The method as claimed in claim 12, wherein the first frequency is more than four times greater than the second frequency.

14. The method as claimed in claim 12, wherein the first frequency is four times the second frequency.

15. The method as claimed in claim 10, wherein the driving the panel comprises displaying an image from a bottom of the panel to a top of the panel,
wherein the driving the upper backlight unit and the lower backlight unit comprises driving the lower backlight unit to be turned on when an image display is completed on the lower part of the panel and the upper backlight unit to be turned on when the image display is completed on the upper part of the panel.

16. The method as claimed in claim 10, wherein the input image signal is a three-dimensional image including a left eye image and a right eye image.

17. The method as claimed in claim 10, further comprising:
converting a frame rate by a frame rate converter by converting a frequency of the input image signal and outputting a converted image signal; and
generating an image signal in the first frequency by a repeater by increasing a frequency of the converted image signal output from the frame rate converter.

18. The method as claimed in claim 10, further comprising:
converting a frame rate by a frame rate converter by converting a frequency of the input image signal and outputting a converted image signal,
wherein the driving a panel comprises driving the panel in the first frequency by a timing controller by increasing a frequency of the converted image signal output from the frame rate converter.

19. A display apparatus comprising:
a panel which displays input image data;
a backlight unit which irradiates backlight on the panel;
a timing controller which drives the panel in 480 Hz according to an input image signal; and
a backlight driving unit which drives the backlight unit based on the 480 Hz so that a time period during which both a portion of the backlight unit and a rest of the backlight unit are simultaneously turned on exceeds half of a time period during which the portion of the backlight unit is turned on,
wherein the 480 Hz displays more than two frames in the panel while the portion of the backlight unit is turned on.

20. The display apparatus as claimed in claim 19, further comprising:
a frame rate converter which converts the input image signal having a frequency of 60 Hz into a converted image signal having a frequency of 240 Hz and outputs the converted image signal; and
a repeater which increases the frequency of the converted image signal output from the frame rate converter from 240 Hz to 480 Hz to generate an image signal in 480 Hz and transmits the image signal in 480 Hz to the timing controller.

21. The display apparatus as claimed in claim 19, further comprising:
a frame rate converter which converts the input image signal having a frequency of 60 Hz into a converted image signal having a frequency of 240 Hz and outputs the converted image signal,
wherein the timing controller drives the panel in 480 Hz by increasing the frequency of the converted image signal output from the frame rate converter from 240 Hz to 480 Hz.

22. The display apparatus as claimed in claim 19, wherein the timing controller drives the panel so that a three-dimensional image including a left eye image and a right eye image is displayed.

23. The display apparatus as claimed in claim 19,
wherein the backlight unit is one of a backlight unit with an up and down driving method, a backlight unit with a left and right driving method and a backlight unit with a light-emitting diode blinking method.

24. A method for driving display including a panel which displays input image data, a timing controller which drives the panel, and a backlight unit which irradiates backlight on the panel, the method comprising:
receiving an input image signal in a first frequency;
driving the panel in a second frequency according to the input image signal, wherein the second frequency is eight times the first frequency; and
driving the backlight unit based on the second frequency so that a time period during which both a portion of the backlight unit and a rest of the backlight unit are simultaneously turned on exceeds half of a time period during which the portion of the backlight unit is turned on,
wherein the second frequency displays more than two frames in the panel while the portion of the backlight unit is turned on.

25. The method as claimed in claim 24, further comprising:
converting a frame rate by a frame rate converter by converting a frequency of the input image signal from the first frequency to a third frequency that is four times the first frequency, and outputting a converted image signal from the frame rate converter; and
generating an image signal in the second frequency by a repeater by increasing the third frequency of the converted image signal output from the frame rate converter from the third frequency to the second frequency.

26. The method as claimed in claim 24, further comprising:
converting a frame rate by a frame rate converter by converting a frequency of the input image signal from the first frequency to a third frequency that is four times the first frequency, and outputting a converted image signal,
wherein the driving the panel by the timing controller comprises driving the panel in the second frequency by increasing the third frequency of the converted image signal output from the frame rate converter from the third frequency to the second frequency.

27. The method as claimed in claim 24, wherein the input image signal is a three-dimensional image signal including a left eye image and a right eye image.

28. The method as claimed in claim 24, further comprising:
irradiating backlight on the panel,
wherein the irradiating the backlight comprises irradiating the backlight using one of a backlight unit with an up and down driving method, a backlight unit with a left and right driving method, and a backlight unit with a light-emitting diode blinking method.

* * * * *